United States Patent [19]

Chiba

[11] Patent Number: 4,866,603
[45] Date of Patent: Sep. 12, 1989

[54] MEMORY CONTROL SYSTEM USING A SINGLE ACCESS REQUEST FOR DOUBLEWORD DATA TRANSFERS FROM BOTH ODD AND EVEN MEMORY BANKS

[75] Inventor: Takashi Chiba, Kawasaki, Japan

[73] Assignee: Fujitsu Limited, Kawasaki, Japan

[21] Appl. No.: 147,071

[22] Filed: Jan. 20, 1988

Related U.S. Application Data

[63] Continuation of Ser. No. 746,192, Jun. 18, 1985, abandoned.

[30] Foreign Application Priority Data

Jun. 21, 1984 [JP] Japan ................................ 59-127805

[51] Int. Cl.⁴ ....................... G06F 13/14; G06F 12/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,008,462 | 2/1977 | Kanda | 364/200 |
| 4,438,493 | 3/1984 | Cushing et al. | 364/200 |
| 4,439,827 | 3/1984 | Willkes | 364/200 |
| 4,467,419 | 8/1984 | Wakai | 364/200 |
| 4,580,214 | 4/1986 | Kubo et al. | 364/200 |
| 4,680,730 | 7/1987 | Omoda et al. | 364/900 |
| 4,713,759 | 12/1987 | Yamagishi et al. | 364/200 |
| 4,755,933 | 7/1988 | Teshima et al. | 364/200 |
| 4,773,048 | 9/1988 | Kai | 364/200 |

*Primary Examiner*—Archie E. Williams, Jr.
*Assistant Examiner*—Emily Y. Char
*Attorney, Agent, or Firm*—Staas & Halsey

[57] ABSTRACT

A memory access control system has a main memory having a plurality of memory banks divided into two groups, thus enabling parallel processing for data, a command/address bus line, a write data bus line, a read data bus line, and a device for simultaneously activating one request for access to the memory bank belonging to one group and another request for access to the memory bank belonging to the other group.

14 Claims, 12 Drawing Sheets

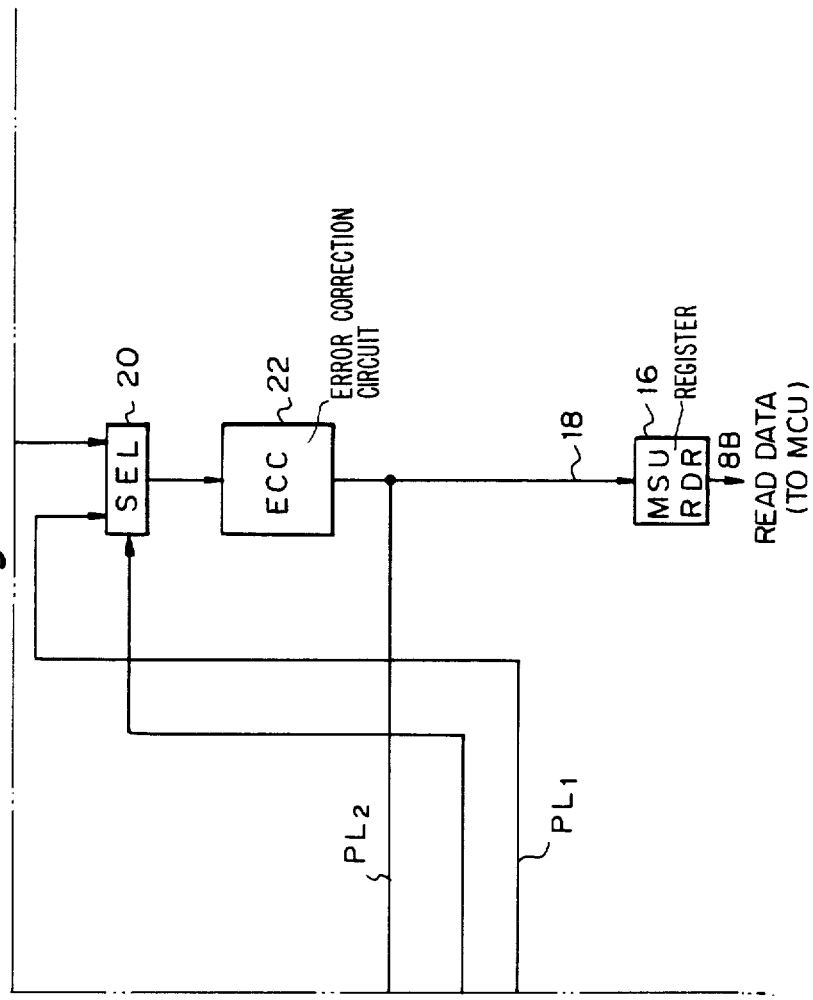

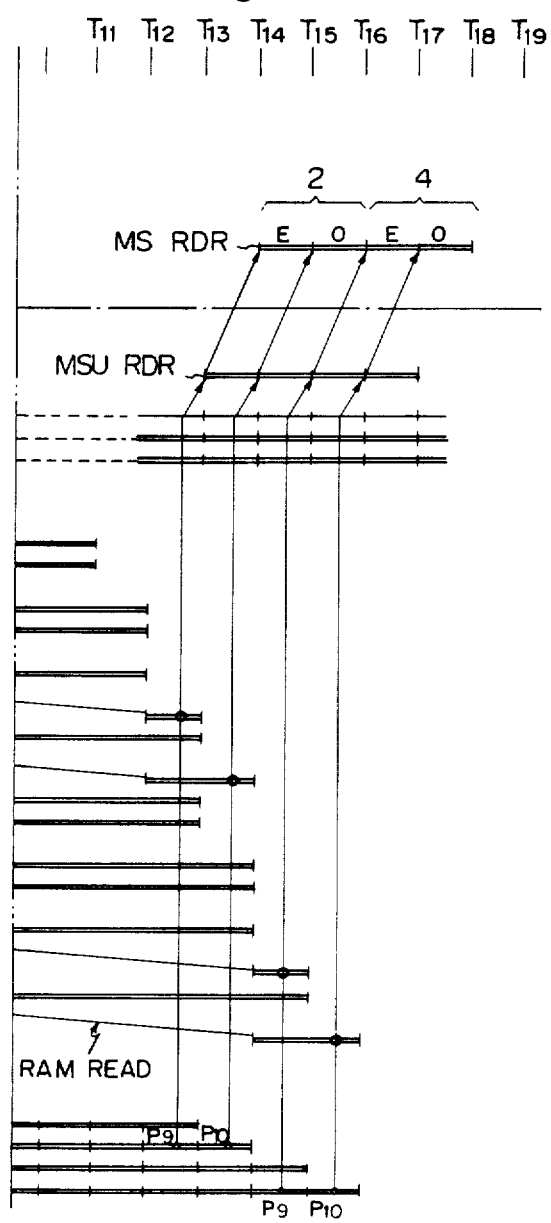

MEMORY CONTROL SYSTEM USING A SINGLE ACCESS REQUEST FOR DOUBLEWORD DATA TRANSFERS FROM BOTH ODD AND EVEN MEMORY BANKS

This is a continuation of co-pending application Ser. No. 746,192, filed on June 18, 1985, now abandoned.

BACKGROUND OF THE INVENTION

1. Field of the Invention

The present invention relates to a memory access control system. More particularly, it relates to an access control system for a main memory having a plurality of memory banks. The present invention is advantageously used in the main memory of a computer system.

2. Description of the Related Art

Recently, a method was disclosed for dividing the main memory of a computer system into a plurality of memory banks, thus enabling parallel processing for the data and raising the practical throughput for the data in the main memory.

In this method, at least two data bus lines are provided for inputting write data and for outputting read data. Each of the data bus lines is used separately for input and output operations to facilitate control of the bus line and to raise the throughput for the data.

In this case, however, there is a fifty percent limitation value on the utilization efficiency of the bus line, because either the input or the output bus line is selected alternatively for every request for access to the memory. The problems concerning the utilization efficiency of the bus lines will be explained in detail hereinafter.

SUMMARY OF THE INVENTION

The primary object of the present invention is to provide a memory access control system to be used in a main memory of a computer system.

Another object of the present invention is to provide a memory access control system that will raise the utilization efficiency of and enable an improvement in the throughput of data bus lines between the main memory and a memory control unit, and between the memory control unit and a central processing unit or a channel processing unit.

In accordance with the present invention, there is provided a memory access control system including: at least one main memory having a plurality of memory banks divided into two groups, thus enabling parallel processing for data; a command/address bus line, a write data bus line, and a read data bus line; and a device for simultaneously activating one request for access to the memory bank belonging to one particular group and another request for access to the memory bank belonging to another group.

BRIEF DESCRIPTION OF THE DRAWINGS

In the drawings;

FIGS. 4A to 4D are detailed block diagrams of the main memory shown in FIG. 3;

FIGS. 5A and 5B are timing charts for commands, addresses, write data, and read data in the main memory shown in FIG. 4;

DESCRIPTION OF THE PREFERRED EMBODIMENTS

Before describing the preferred embodiments, an explanation will be given of a conventional memory access control system.

Figure 1:
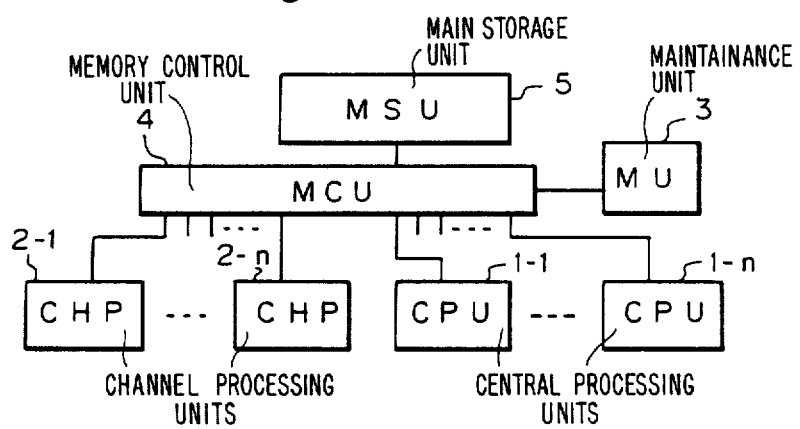
FIG. 1 is schematic block diagram of a relatively large scale computer system.

FIG. 1 is a schematic block diagram of a relatively large scale computer system using at least one main memory (main storage unit) having a plurality of memory banks.

In FIG. 1, reference numerals 1-1 to 1-n represent a plurality of central processing units (CPU), 2-1 to 2-n a plurality of channel processing units (CHP), 3 a maintenance unit (MU), 4 a memory control unit (MCU), and 5 a main storage unit (MSU). Each CHP 2 and CPU 1 is connected to the MSU 5 through the MCU 4. The MU 3 is connected directly to the MCU 4.

In this system, the MCU 4 forms a queue by receiving requests for access to the MSU 5 transmitted from the CHP 2 or CPU 1, transfers the access requests to the MSU 5 in order based on the queue, and then transfers the read data from the MSU 5 to the CHP 2 or CPU 1 which has requested access to the data.

Figure 2:
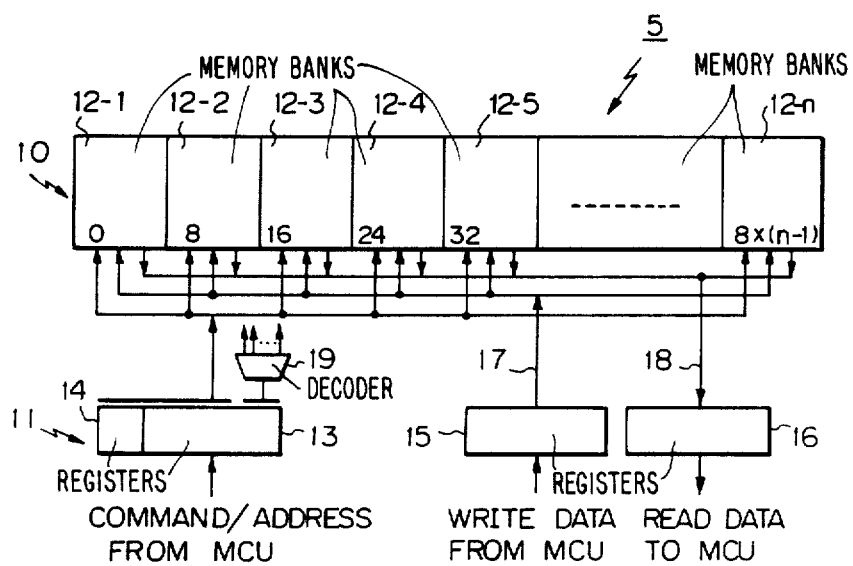
FIG. 2 is a conventional schematic structure of the main memory, shown in FIG. 1.

FIG. 2 is a conventional schematic structure of the main storage unit (MSU) 5. The MSU 5 is constituted by an array section 10 having a plurality of memory banks 12-1 to 12-n and a control section 11 having an address register 13 and a command register 14. Each of the memory banks 12-1 to 12-n can independently write and read the data.

A memory address is assigned to each of the memory banks 12-1 to 12-n by an interleaving method. That is, where there are eight bytes per one word, the byte address is assigned to each memory bank 12, i.e., memory bank 12-1 is "0", memory bank 12-2 is "8", memory bank 12-3 is "16", . . . and memory bank 12-n is "8×(n−1)", as shown in FIG. 2.

The operation of this system will be explained hereinafter.

The MCU 4 sets the memory address to be accessed to the address register 13 of the MSU 5, and sets the read or write command to the command register 14 of the MSU 5 based on the access request from, for example, the CPU 1. When in the writing mode, the MCU 4 simultaneously sets the data to be written to the write data register 15.

The MSU 5 selects one of the memory banks 12 by a decoded output based on a part of the contents of the register 13 in a decoder 19, and transfers the write data of the write data register 15 to a bank address register and a bank data register included in the memory bank 12. Accordingly, only one memory bank selected by the decoded output based on the content of the decoder 19 is operated by one access request.

In the read operation, the data to be read from the selected memory bank 12 is set to a read data register 16, and transferred from the read data register 16 to the MCU 4.

In this case, the operation for setting the memory address from the address register 13 to the bank address register in the memory bank 12 occupies at least one cycle, and, in general, the access operation in the memory bank 12 itself occupies several cycles. Accordingly, although the memory bank 12 under operation is occupied by the access operation during this time, another memory bank 12 can set the next memory address in order.

In the memory having a plurality of memory banks, the read or write data of one word per one cycle can be input to or output from the MSU 5 at a very high utilization efficiency.

In the conventional structure shown in FIG. 2, however, the above-explained data throughput is limited because either the bus line 17 or the bus line 18 is used alternately for each access request. Consequently, the utilization efficiency for each bus line cannot exceed a maximum value of fifty percent.

A more effective utilization, i.e., an improvement of the practical throughput, has not yet been sufficiently achieved in the conventional memory access control system.

A memory access control system according to an embodiment of the present invention will be described.

Figure 3:
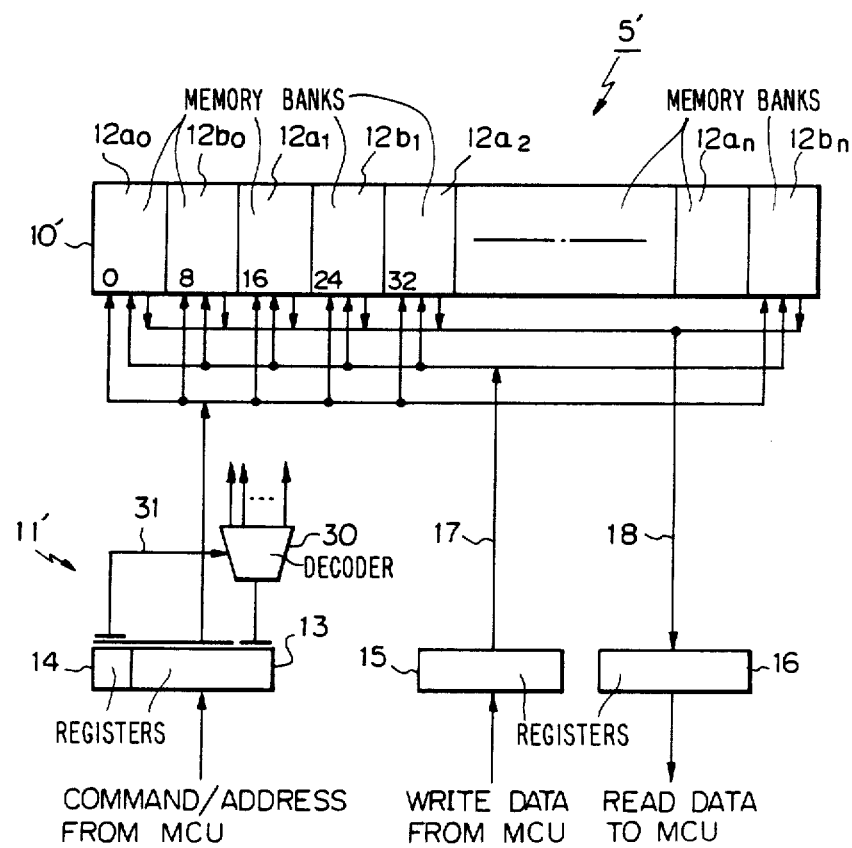
FIG. 3 is a schematic structure of a main memory according to an embodiment of the present invention.

FIG. 3 shows a schematic structure of a main storage unit (MSU) 5′ according to an embodiment of the present invention.

In FIG. 3, the same reference numerals signify the same components as in FIG. 2. The main storage unit (MSU) 5′ comprises an array section 10′ divided into two groups of memory banks, i.e., even number memory banks (even banks) belonging to one group $12a0$ to $12an$ and odd number memory banks (odd banks) belonging to the other group $12b0$ to $12bn$, in accordance with whether the word address number is odd or even. Each memory address is assigned to each of the memory banks by an interleaving method as in the case of conventional memory banks.

In the present invention, a two-word access command is used to obtain access to the memory banks. The two-word command comprises, for example, sixteen bytes (2× eight bytes per one word) and can designate two memory banks by the access of two words constituted by a sequential address.

The basic operation of the MSU 5′ is explained below.

The memory address and command sent from the memory control unit (MCU) are received by the address register 13 and the command register 14.

When the command received by a register 14 is not the two-word command, i.e., if it is the eight bytes of one a one-word command, only one memory bank is activated. In this case, the MSU 5′ operates under the same procedure as for the conventional system.

When the command received by a register 14 is the two-word command, a decoder 30 selects in sequence two memory banks, each having the respective sequential address, in other words alternately from the even bank group and the odd bank group. Accordingly, two memory banks from the adjoining even and odd banks are selected by the decoder 30. In this case, the even bank having the even address is designated first by a head memory address of a so-called two-word boundary (16 bytes boundary).

FIGS. 4A to 4D are detailed block diagrams of the main storage unit shown in FIG. 3. In FIGS. 4A to 4D, reference numerals of even banks 0, 2, 4, 6 ---, N−1 correspond to the even banks $12a0$, $12a1$, $12a2$ --- $12an$ shown in FIG. 3. Similarly, odd banks 1, 3, 5 --- N correspond to the odd banks $12b0$, $12b1$, $12b2$ --- $12bn$ shown in FIG. 3. Each memory bank, whether even or odd, comprises a bank register constituted by an address register A, a write data register WD, and a read data register RD. Reference numerals 19 and 20 represent selectors (SEL). The selector, 19 is used only for the partial store data, and functions to merge the partial store data with the write data. The selector 20 has two functions, to merge the partial store data with the write data and to take an output timing of the read data in correspondence with the output of the control pipeline 21. Reference number 21 is a pipeline register consisting of a control pipeline (CTRL) $21a$ and a write data pipeline (WD) $21b$. The CTRL pipeline $21a$ controls the output timing of the read data by shifting the access request, and the WD pipeline $21b$ controls the partial store data as explained below. Reference 22 represents means for generating an error correcting code (ECC). Reference numeral 30 is a decoder generating a "BANK GO" command to activate the selected memory bank based on the two-word, command sent from the command (CMD) register 14.

Figure 5A:
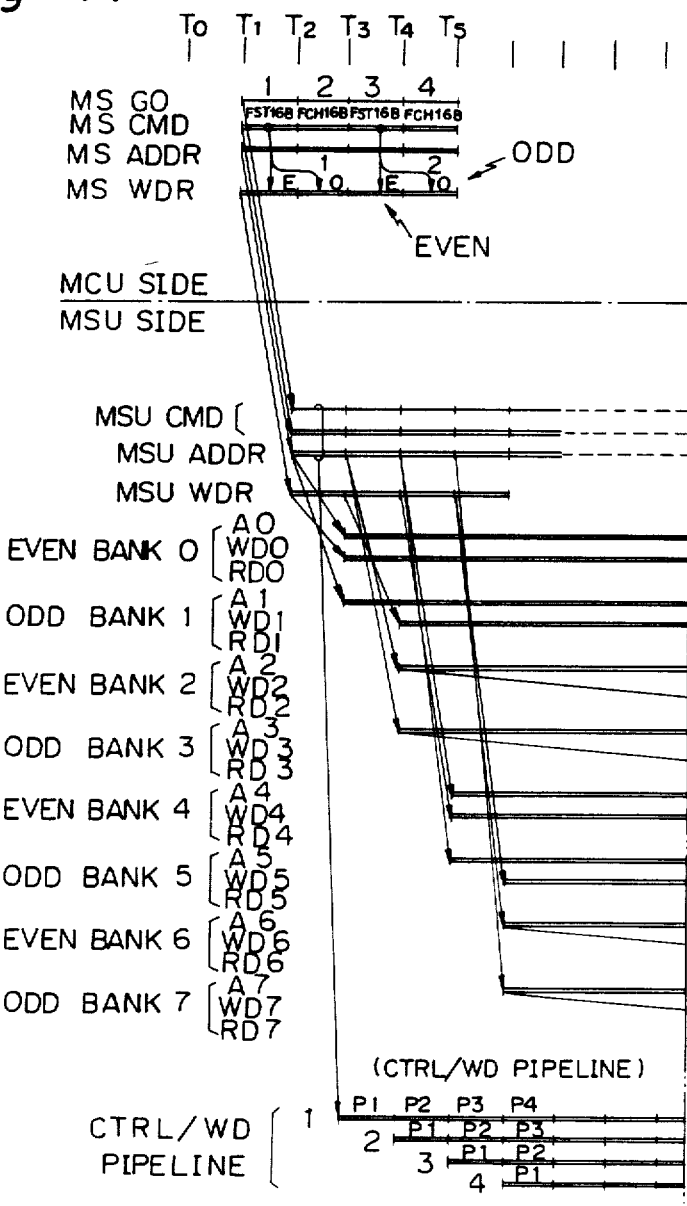

FIGS. 5A and 5B are timing charts of the operation in the command register 14, the address register 13, each of the memory banks, and the CTRL/WD pipelines $21a$ and $21b$.

The portion above the chain dotted line in the figures is the memory control unit side.

The operation of the MSU 5′ shown in FIG. 4 will be explained in detail with reference to the timing chart shown in FIG. 5.

Reference letters $T_0$, $T_1$, $T_2$ --- $T_{19}$ show access request timings for the operation of each register and memory bank. The period between each of the timings is equivalent to one access request cycle.

At the timing $T_2$, the address register (MSU ADDR) 13 receives the memory address sent from the command/address register (MS CMD/ADDR) in the memory control unit (MCU) at the timing $T_1$. The command register (MSU CMD) 14 also receives, for example, the two-word command sent from the MS CMD/ADDR in the MCU at the timing $T_1$, and the write data register (MSU WDR) 15 also receives the write data sent from the write data register (MS WDR) in the MCU at the timing $T_1$.

Where a two-word command, i.e., a 16-byte command, is sent, the MSU CMD 14 sends the 16-byte command to the decoder (DEC) 30. The decoder 30 generates the "BANK GO" command to the corresponding two memory banks selected, for example, EVEN BANK 0 and ODD BANK 1, and activates these banks.

In the write mode, at the timing $T_3$, the bank address register $A_0$ in the EVEN BANK 0 and the bank address register $A_1$ in the ODD BANK 1 simultaneously receive the respective memory address, and the bank write data register $WD_0$ in the EVEN BANK 0 also receives the write data. However, the bank write data register $WD_1$ in the ODD BANK 1 receives the write data after a delay of one cycle, i.e., at the timing $T_4$.

When the command received by the MSU CMD 14 is not the two-word command, only one memory bank is directly, activated, but not through the decoder 30, rather by the MSU ADDR 13 and the MSU WDR 15.

In the read mode, at the timing $T_4$, the address register $A_2$ in the EVEN BANK 2 and the address register $A_3$ in the ODD BANK 3 each simultaneously receive the respective read address, and the read data register $RD_2$ in the EVEN BANK 2 reads out the stored data after eight cycles, i.e., at the timing $T_{12}$, and this read out data is output from the read data register (MSU RDR) 16 through the ECC register 22. However, the read data register $RD_3$ in the ODD BANK 3 reads out the stored data after a delay of one cycle, i.e., at the timing $T_{13}$. This read out control is performed by the control pipeline (CTRL) 21a.

As shown in the upper portion of FIGS. 5A and 5B, the command register (MS CMD) in the MCU can alternately command "write" and "read" instructions which consist of the two-word command (FST 16 bytes and FCH 16 bytes, where FST is full store data and FCH is fetch data). As mentioned above, the address register (MS ADDR) in the MCU sends commands to the address register (MSU ADDR) 13, and the MSU ADDR 13 designates two memory banks in the EVEN and ODD BANKS for both the "write" (store) and "read" (fetch) modes. Accordingly, at each timing, the MSU ADDR 13 can always activate two memory banks at every one cycle. These operations are performed similarly for other memory banks in the EVEN and ODD banks.

As can be clearly understood, when the write or read access requests consisting of the two-word command are alternately and sequentially generated from the MS CMD/ADDR in the MCU, the MSU ADDR 13 designates two memory banks in the EVEN and ODD BANKS based on a portion of the lower bank address, and the MSU WDR 15 sends the write data to the designated memory bank at the predetermined timing.

Accordingly, as shown in the figure, after the timing $T_{13}$, the MSU WDR 15 and the MSU RDR 16 simultaneously hold the data, i.e., the MSU WDR 15 holds the write data and the MSU RDR 16 holds the read data.

Consequently, the utilization efficiency, i.e., practical throughput, of the data bus lines 17 and 18 can be raised to a value of a hundred percent as the maximum efficiency value.

The CTRL pipeline 21a functions as a shift register. This pipeline 21a can shift the access request input from the MSU CMD 14 and the MSU RDR 13 by each pitch of $P_1$, $P_2$ ---. For example, the shifting of the access request cycle 1 of the "MS GO" command in the MCU is started at the timing $T_2$, at which the EVEN BANK 0 and the ODD BANK 1 are designated. Similarly, the shifting of the access request cycle 2 is started at the timing $T_3$, at which the EVEN BANK 2 and the ODD BANK 3 are designated.

When the shifted pitch of the cycle 2 reaches the timing $P_9$, the read data of the $RD_2$ of the EVEN BANK 2 is output to the MSU RDR read data register 16 by taking into account the correspondence between the read data and the shifted data in the selector (SEL) 20. At the next timing $P_{10}$, the read data of the read data register $RD_3$ of the ODD BANK 3 is output to the MSU RDR 16. In this case, the CTRL pipe line 21a controls the output of $RD_3$ so that it is delayed by only one access cycle, to enable $RD_3$ to output the read data after a delay of one cycle of the output of the $RD_2$. At the timings $P_9$ and $P_{10}$ of the cycle 4, the read data of $RD_6$ and $RD_7$ are output by the same method as in the cycle 2.

Figure 4A:
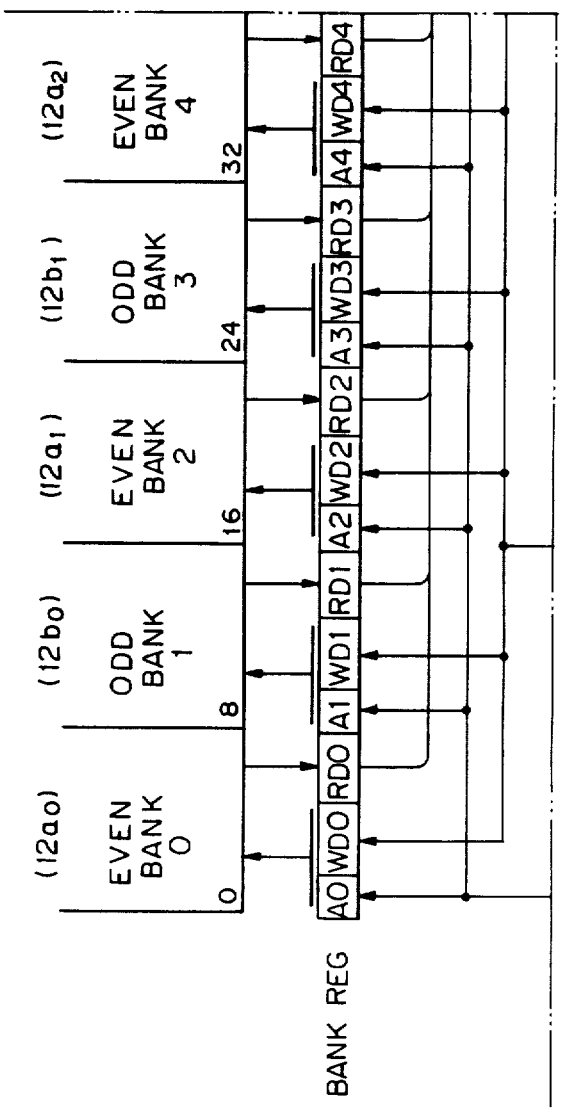
Figure 4B:
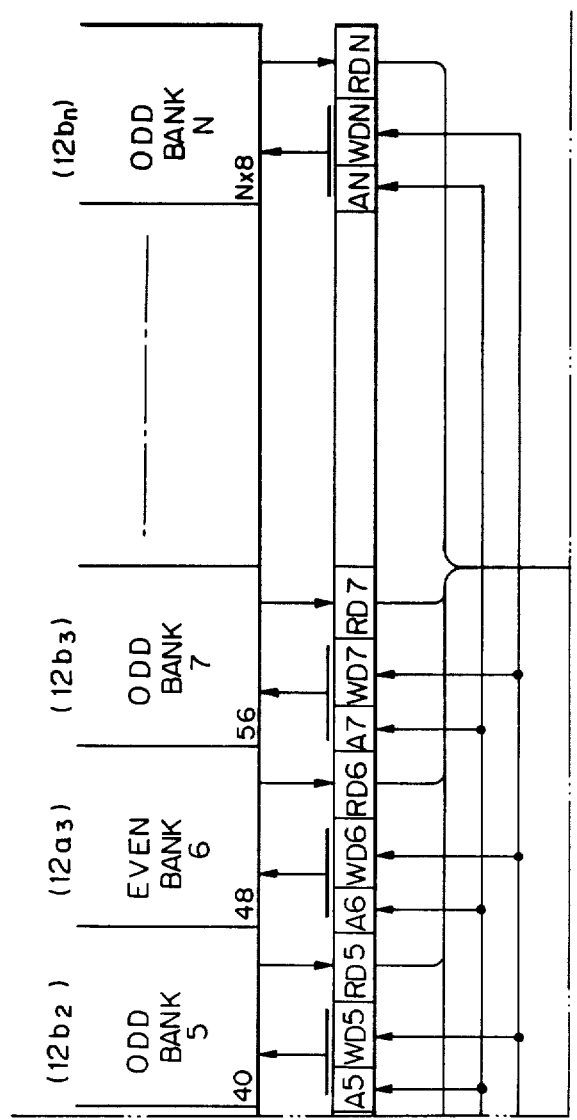
Figure 4C:
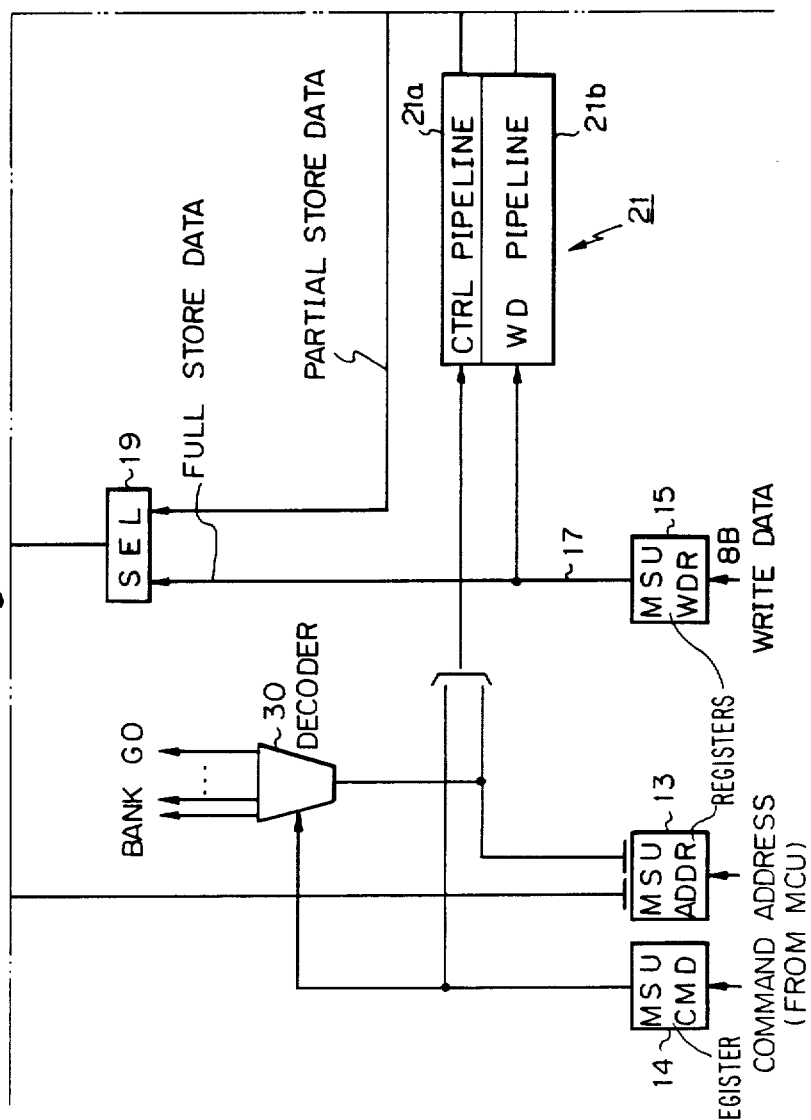

The WD pipeline 21b shown in FIG. 4C is used for changing the 8-byte write data to, for example, 2-byte write data, as partial store data. This pipeline 21b is activated by a "load access" sent from the MSU WDR 15. Two bus lines $PL_1$ and $PL_2$ are used for this operation. That is, the partial store data, for example, 2-byte write data, is sent to the SEL 20 and merged with the 8-byte read data. The merged 8-byte write data is sent to the SEL 19 through the ECC 22. The ECC 22 provides a ne error correcting code to the new 8-byte write data. The output data of the SEL 20 is then written in the designated memory bank as the 8-byte write data as explained above.

Figure 6A:
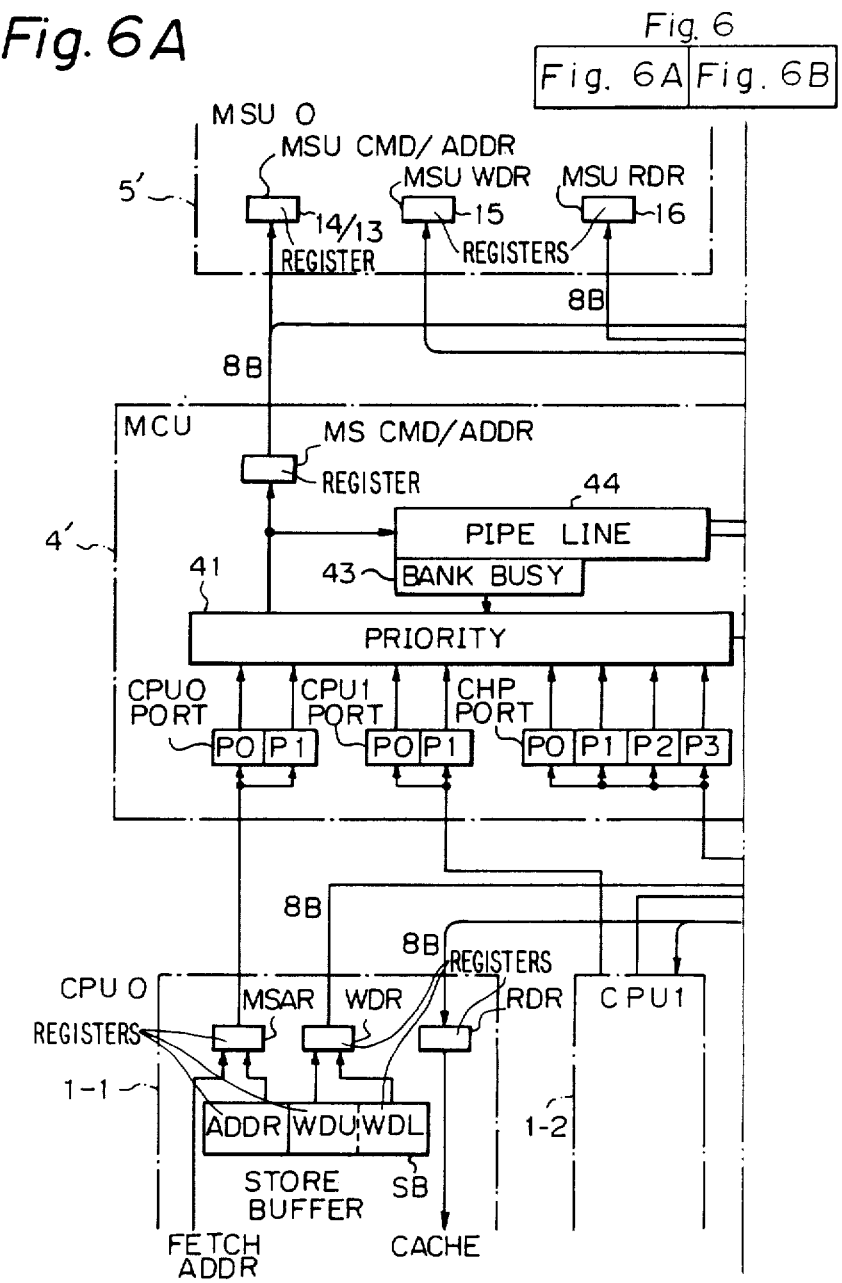
FIGS. 6A and 6B are detailed block diagrams of a memory control unit according to an embodiment of the present invention; and, FIGS. 7 and 8 show control circuits provided at each of the memory banks shown in FIG. 4.
Figure 6B:
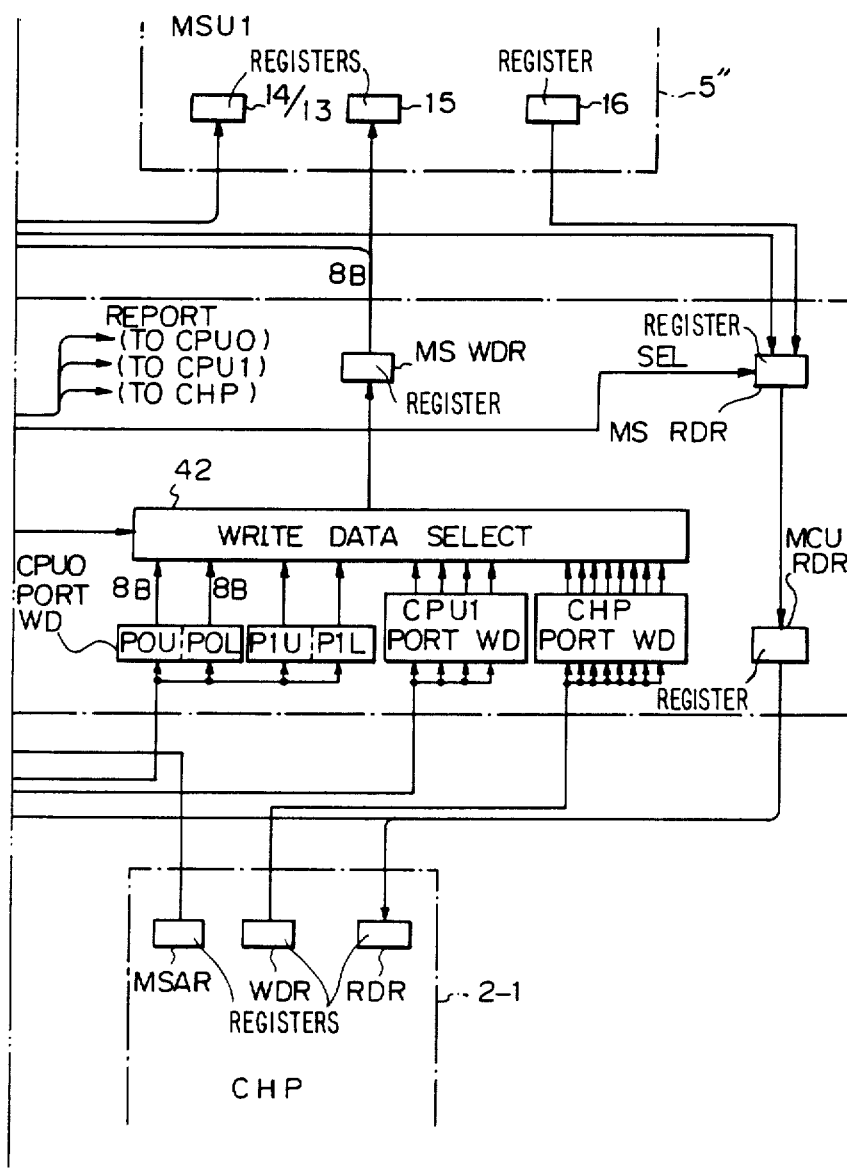

FIGS. 6A and 6B are detailed block diagrams of the memory control unit (MCU) 4' according to an embodiment of the present invention. In FIG. 6B, another main storage unit (MSU) 5" is connected to the MCU 4' through the bus line, and the central processing units (CPU 0, CPU 1) and the channel processing unit CHP are also connected to the MCU 4' through the bus line. For the purpose of raising the practical throughput, the MCU 4' comprises, for example, two input ports $P_0$ and $P_1$ for the address command sent from the address register MSAR in the CPU 0, two input ports $P_0$ and $P_1$ for the CPU 1, and four channel ports $P_0$, $P_1$, $P_2$, and $P_3$ for the CHP. The MCU 4' also comprises write data ports corresponding to each CPU 0 port, CPU 1 port, and CHP port. For example, the CPU 0 port WD is constituted by the ports $P_{0U}$ and $P_{0L}$ corresponding to the port $P_0$, and the ports $P_{1U}$ and $P_{1L}$ corresponding to the port $P_1$. The port $P_{0U}$ is used for the upper 8 bytes and the port $P_{0L}$ for the lower 8 bytes. Accordingly, each port $P_0$, $P_1$, $P_2$, and $P_3$ comprises a 16-byte capacity, so that the CHP port WD comprises a 64-byte (16 bytes $\times$ 4) capacity. Each port comprises a capacity of at least two words of the data (for example, 8 bytes $\times$ 2), according to the present invention.

As can be clearly understood, a plurality of ports are provided in the MCU 4' corresponding to each CPU and CHP in order to raise the practical throughput of the MCU. These ports are provided because, since the practical throughput between the MSU and MCU is raised by using the above-explained division and control of the memory banks, it is necessary to raise the practical throughput between the MCU and CPU or CHP.

In FIGS. 6A and 6B, the priority circuit 41 decides the priority of the address sent from each CPU 0, CPU 1 and CHP port, and sends the address selected by the priority decision to the write data selection register 42.

The register 42 recognizes the corresponding port of the priority address selected by the priority circuit 41 and sends the corresponding write data to the MSU 5' or MSU 5" through the write data register MS WDR. In this case, the register 42 functions to select the two-word command, i.e., 16 bytes per two cycles (the upper 8 bytes are always selected first, and then the lower 8 bytes are selected), or the one-word command, i.e., 8 bytes per one cycle (in this case, only the upper 8 bytes are used).

The BANK BUSY register 43 is used for storing the flag of the bank accessed by the priority circuit 41 in order to control the next access, namely for preventing a subsequent access which designates the same memory bank as that the just previously accessed. This flag operation is used because, since the just previously accessed memory bank is "busy" when the same memory bank is designated again, the next access must be delayed for the predetermined term to avoid access collision.

The pipeline 44 selects the fetch data read out from the MSU 5' and the MSU 5" by watching the read out timings of the MSU 5' and the MSU 5". The pipeline 44 also reports data transmission, completion of store and the like to the CPU and CHP.

The selection between the MSU 5' and the MSU 5" is performed by the head address stored in each MSU and in the pipeline 44, in accordance with the correspondence between both head addresses.

In the CPU, the store buffer SB comprises the address register ADDR, and the write data registers WDU and WDL. The store buffer SB is used with the cache register (not shown). Each of the registers WDU and WDL comprise 8 bytes of upper data and 8 bytes of lower data, i.e., a total of 16-byte of data per one address. For a store (write) access of 16 bytes, the store buffer SB outputs a 16-byte data access, i.e., a two-word access per two access cycles. The 16-byte data access is, in general, used whenever there is a data store access of more than 8 bytes, for example, a "move" command, or "store-multi" command. For a store access of an 8-byte data, only the upper 8 bytes are used for data access per one cycle.

Accordingly, discrimination between the 16-byte data access and the 8-byte data access, i.e., between a two-word access and a one-word access, is based on the kind of command received (for example, "move", "store-multi", etc.) and the data length of the write data.

Figure 7:
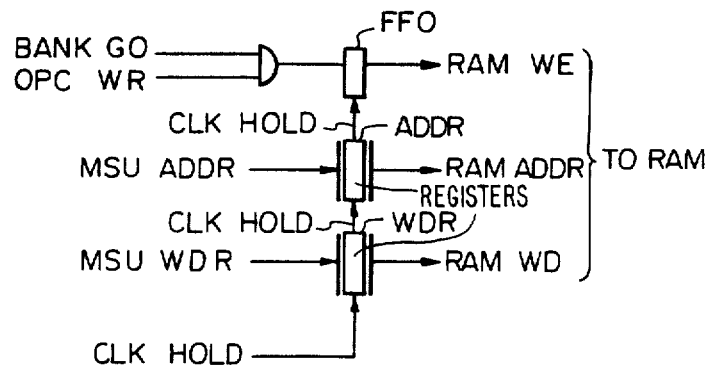
Figure 7:
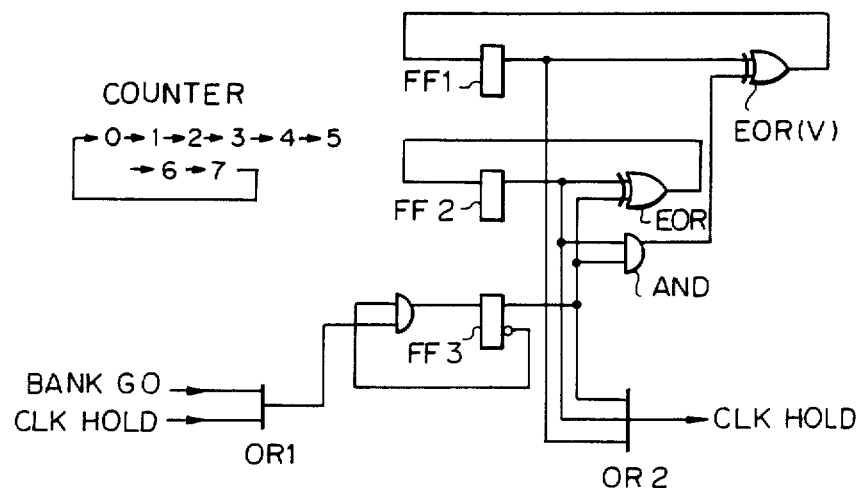
Figure 8:
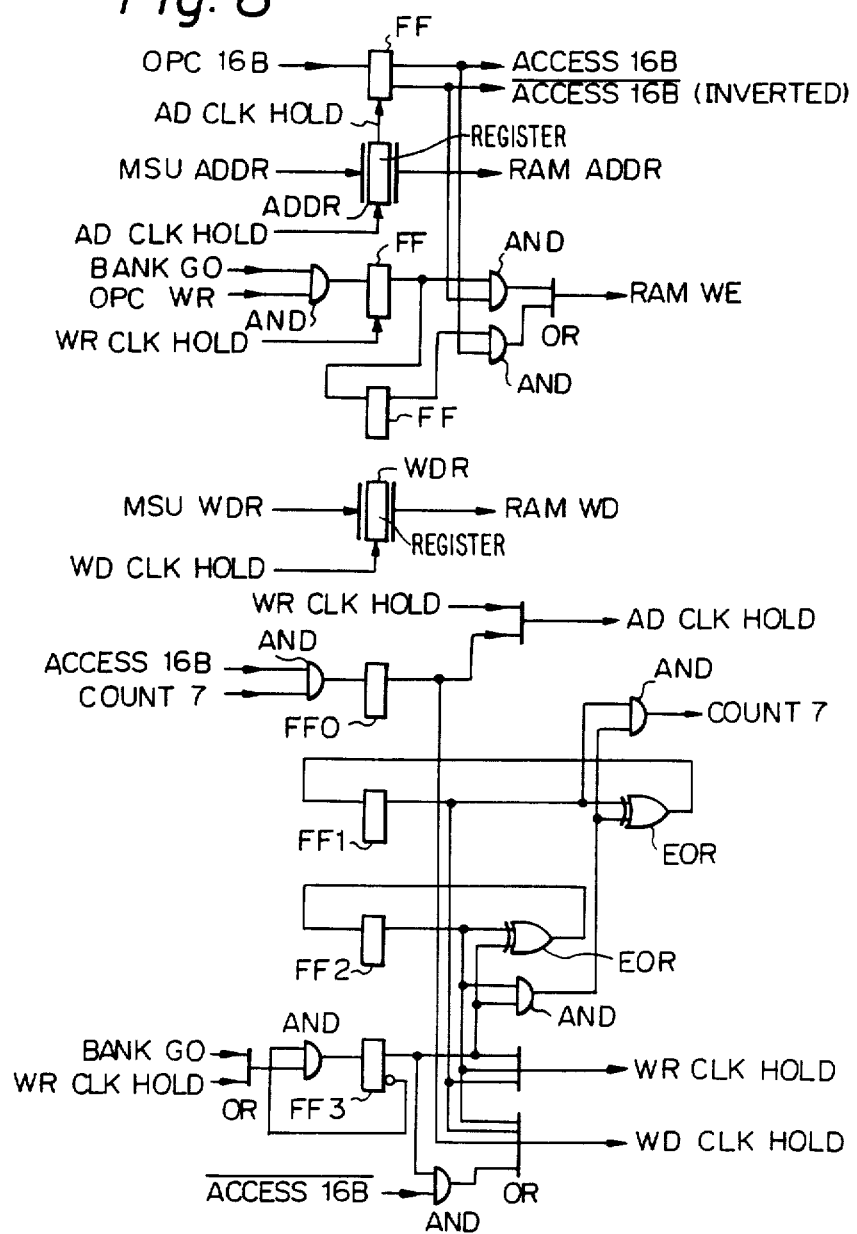

FIGS. 7 and 8 show control circuits of the memory bank. The control circuit shown in FIG. 7 is provided at the input portion of each EVEN BANK, and the control circuit shown in FIG. 8 is provided at the input portion of each ODD BANK.

In FIG. 7, the lower portion of the circuit is a three-bit counter as one embodiment. The flip-flop FF1 is used for the most significant bit, and the flip-flop FF3 is used for the least significant bit. When the "BANK GO" signal generated from the decoder 30 is input to the OR gate OR1, the circuit starts the count from "0". The output OR gate OR2 always reaches a high level and outputs the clock hold signal CLK HOLD when the count is between "1" to "7". The signal CLK HOLD holds the contents of the registers when it is turned ON. The input of the clock signal is inhibited while the CLK HOLD is turned ON.

When the CLK HOLD is being output, even if the "BANK GO" is stopped, (the BANK GO is output for only one cycle), the count is continued. Further when the count returns to "0" from "7", generation of the CLK HOLD is stopped and the count also is stopped.

Accordingly, since the content of each of the registers ADDR and WDR is held by the CLK HOLD, the next access request cannot be received while the CLK HOLD is turned ON.

For the EVEN BANK, an operation code OPC WR provided to the head of the memory address indicates whether there is a one-word command (8-byte command) or two-word command (16-byte command). Accordingly, when the BANK GO and OPC WR are input to the flip-flop FF0 through the AND gate, the write enable signal RAM WE having the high level signal is output directly from the flip-flop FF to the memory bank.

In FIG. 8, the lower portion of the circuit is a three-bit counter, as in the circuit shown in FIG. 7. Accordingly, the flip-flop FF1 is used for the most significant bit, and the flip-flop FF3 is used for the least significant bit. When the operation code does not indicate a 16-byte access, the write clock hold signal WR CLK HOLD is used equivalently as the address clock hold signal AD CLK HOLD and the write data clock signal WD CLK HOLD. In this case, the operation of this circuit is the same as that of the circuit shown in FIG. 7.

When the operation code indicates a 16-byte access, the WD CLK HOLD signal is delayed by one cycle from that of the WR CLK HOLD and receives the data at the second cycle. When the AD CLK HOLD signal is longer by one cycle than that of the WR CLK HOLD, the AD CLK HOLD holds the address for an extra one cycle. When the operation code 16B indicates a 16-byte access, if the 16-byte access is input to the flip-flop FF, the output timing of the write enable WE is delayed by only one cycle by using both AND gates and flip-flop circuit. When the count becomes "7", the 16-byte access is delayed by only one cycle by using the flip-flop FF0. Accordingly, the AD CLK HOLD is delayed by one cycle by the output of the OR gate.

I claim:

1. A memory access control system for a processor which generates a single access request, said system comprising:
   at least one main memory having a plurality of memory banks divided into two groups,
   bus means for transferring data and including a command/address bus line, a write data bus line, and a read data bus line all coupled to said main memory, and
   activating means, coupled to said bus means, for activating one access for one of said plurality of memory banks belonging to one group and another access for one of said plurality of memory banks belonging to the other group in response to the single access request allowing two data transfers, one from each group, to be sequentially performed on either the write data bus line or the read data bus line for the single access request transferred over the command/address bus line, said activating means comprising:
   detecting means for detecting that a single access request having a first address for one group is a double word access;
   means for generating a second address for the other group in response to detection of the double word access; and
   starting means for starting access in dependence on the first address and starting access in dependence on the second address.

2. A memory access control system for a processor which generates a single access request, said system comprising:
   at least one main memory having a plurality of memory banks divided into two groups, said two groups of said plurality of memory banks are constituted by memory banks having even numbers and memory banks having odd numbers, and each said even numbered memory bank adjoins a respective one of said odd numbered memory banks,
   bus means for transferring data and including a command/address bus line, a write data bus line, and a read data bus line all coupled to said main memory, and
   activating means, coupled to said bus means, for activating one access for one of said plurality of memory banks belonging to one group and another access for one of said plurality of memory banks belonging to the other group in dependence on the single access request allowing two sequential data transfers, one from each group, to be performed over said bus means for the single access request, said activating means comprising:

detecting means for detecting that a single access request having a first address for one group is a double word access;

means for generating a second address for the other group in response to detection of the double word access; and starting means for starting access in dependence on the first address and starting access in dependence on the second address.

3. A memory access control system as claimed in claim 1, wherein said activating means further comprises:

a command/address register, connected to said command/address bus line, for sending two-word commands to said main memory and for designating an address for a selected memory bank of each of said two groups, a decoder, connected to said command/address register and said main memory, for activating each respective designated memory bank, a write data register, connected to said write data bus line, for transferring write data, and a read data register, connected to said read data bus line, for transferring read data.

4. A memory access control system, comprising:

at least one main memory having a plurality of memory banks divided into two groups, bus means for transferring data and including a command/address bus line, a write a data bus line, and a read data bus line all coupled to said main memory, and activating means, coupled to said bus means, for, in response to a single access request, simultaneously activating one access for one of said plurality of memory banks belonging to one group and another access for one of said plurality of memory banks belonging to the other group, said activating means comprising:

detecting means for detecting that a single access request having a first address for one group is a double word access;

means for generating a second address for the other group in response to detection of the double word access; and starting means for starting access in dependence on the first address and starting access in dependence on the second address;

a control pipeline register, coupled to said command/address bus line, for controlling an output timing of read data in accordance with the command address, a write data pipeline register, coupled to said write data bus line, for controlling a write timing of partial store data in accordance with the write data, and two selector means, each coupled to said main memory, a first selector means coupled to said main memory and said write data pipeline registers as data inputs and said control pipeline register as a control input and a second selector means coupled to said first selector as an input to receive write data as an input and to said main memory as an output, for merging said partial store data with said write data.

5. A memory access control system as claimed in claim 3, wherein said activating means further comprises a plurality of bank registers corresponding to said plurality of memory banks, each of said bank registers having an address register, a write data register, and a read data register.

6. A memory access control system for a processor which generates a single access request, said system comprising:

at least one main memory having even and odd numbered memory banks divided into two groups, bus means for transferring data and including a command/address bus line, a write data bus line, and a read data bus line all coupled to said main memory, and activating means, coupled to said bus means, for activating one access for one of said plurality of memory banks belonging to one group and another access for one of said plurality of memory banks belonging to the other group in dependence on the single access request allowing two sequential data transfers, one from each group, to be performed over said bus means for the single access request, said activating means comprising:

a command/address register, connected to said command/address bus line, for sending two-word commands to said main memory and for designating an address for a selected memory bank of each of said two groups, a decoder, connected to said command/address register and said main memory, for activating each respective designated memory bank, a write data register, connected to said write data bus line, for transferring write data, a read data register, connected to said read data bus line, for transferring read data, and a plurality of bank registers, corresponding to said plurality of memory banks, each of said bank registers having an address register, a write data register, and a read data register, each said even numbered memory bank and the respective adjoining odd numbered memory bank are simultaneously accessed by said address register responsive to said two-word command, and said even numbered memory bank stores data at the same timing of said access, and said odd numbered memory bank stores data after a delay of one cycle compared with the storing by said even numbered memory bank.

7. A memory access control system as claimed in claim 4, wherein the memory banks have even and odd numbered banks and said activating means further comprises:

a command/address register, connected to said command/address bus line, for sending two-word commands and for designating an address of a selected memory bank, a decoder, connected to said command/address register and said main memory, for activating the respective designated memory bank, a plurality of bank registers coupled to said command/address, write data and read data bus lines and corresponding to said plurality of memory banks, each of said banks registers having an address register, a write data register, connected to said bank registers, for transferring write data, and a read data register, connected to said bank registers, for transferring read data, each said even numbered memory bank and the respective adjoining odd numbered memory bank are simultaneously accessed by said address register responsive to said two-word command, said even numbered memory bank reads out data at the timing of specific cycles after said access, and said odd numbered memory bank reads out data after a delay of one cycle compared with the reading out of said even numbered memory bank, under the control of said control pipeline register.

8. A memory access control system as claimed in claim 2, wherein each said even number memory bank comprises address register means and write data register means for providing their contents as inputs to the respective even memory bank, and counter circuit means for holding the contents of said address register means and said writer data register means.

9. A memory access control system as claimed in claim 2, wherein each said odd number memory bank comprises address register means and write data register for providing their contents as inputs to the respective odd memory bank, and counter circuit means for holding the contents of said address register and said write data register and for delaying write and read timing to the respective odd memory bank by only one cycle.

10. A memory access control system as claimed in claim 3, wherein each said two-word command comprises a sixteen-byte command constituted by two eight-byte commands.

11. A memory access control system as claimed in claim 3, further comprising memory control means for controlling said command/address register, said write data register and said read data register in said activating means.

12. A memory access control system as claimed in claim 1, wherein said write data bus line and read data bus line are used simultaneously for parallel processing of data.

13. A memory access control system, comprising:
first and second memory banks each operating independently of the other;
a processing unit issuing a single access request signal including a two-word transfer command and an address;
a single data transfer bus connecting said processing unit to first and second memory banks; and
transfer activation means for transfer activation, connected between said processing unit and said first and second memory banks, receiving the two word transfer command and the address from the processing unit, and including means for decoding the two-word transfer command and the address, and means for activating said first and second memory banks in response to the two-word transfer command to transfer data of the second memory bank over the single data transfer bus to said processing unit after the data of the first memory bank is transferred over the single data transfer bus, said activating means comprising:
detecting means for detecting that a single access request having a first address for one group is a double word access;
means for generating a second address for the other group in response to detection of the double word access; and
starting means for starting access in dependence on the first address and starting access in dependence on the second address.

14. A system as claimed in claim 13, further comprising delay means, provided in said second memory bank, for delaying transfer of the data of said second memory bank for a predetermined time period in response to activation by said transfer activation means.

* * * * *

UNITED STATES PATENT AND TRADEMARK OFFICE
CERTIFICATE OF CORRECTION

PATENT NO. :  4,866,603
DATED      :  September 12, 1989
INVENTOR(S) : Takashi Chiba It is certified that error appears in the above-identified patent and that said Letters Patent is hereby corrected as shown below:

Col. 3,　line 51, change "one a" to --only a--.

Col. 4,　line 21, delete ",";

line 63, delete "," (first occurrence);

line 64, after "rather" insert --,--.

Col. 5,　line 52, after "RDR" insert --16--.

line 60, delete "the" (second occurrence);

Col. 6,　line 5, "ne" s/b --new--;

Signed and Sealed this

Tenth Day of April, 1990

Attest:

HARRY F. MANBECK, JR.

*Attesting Officer*　　　*Commissioner of Patents and Trademarks*